US008706585B2

(12) United States Patent
Ableman et al.

(10) Patent No.: US 8,706,585 B2
(45) Date of Patent: Apr. 22, 2014

(54) CERTIFIED OFFER SERVICE FOR DOMAIN NAMES

(75) Inventors: Scott Ableman, McLean, VA (US); Suzanne Graham, Arlington, VA (US); Steve Miholovich, Ashburn, VA (US)

(73) Assignee: Network Solutions Inc., Herndon, VA (US)

( * ) Notice: Subject to any disclaimer, the term of this patent is extended or adjusted under 35 U.S.C. 154(b) by 1909 days.

(21) Appl. No.: 10/854,221

(22) Filed: May 27, 2004

(65) Prior Publication Data

US 2006/0004784 A1    Jan. 5, 2006

(51) Int. Cl.
*G06Q 40/00*    (2012.01)

(52) U.S. Cl.
USPC .......................................................... 705/35

(58) Field of Classification Search
USPC .......................................................... 705/35
See application file for complete search history.

(56) References Cited

U.S. PATENT DOCUMENTS 6,338,082 B1    1/2002  Schneider
6,678,717 B1 *  1/2004  Schneider .................... 709/203

OTHER PUBLICATIONS

Internet Archive for Escrow.com (www.web.archive.org) [Dec. 17, 2001].
Internet Archive for Exname.com (www.web.archive.org) [May 19, 2004].
Major advance for London-Based Commodities Portal and Exchange Software Developer, PR Newswire, New York: Oct. 14, 2003.
EXNAME website (exname.com) [see various webpages taken from EXNAME website such as: EXNAME_Registration, EXNAME_Sellers_Questions, EXNAME_Buyers_Questions, etc.,) May 19, 2004.
ESCROW website (escrow.com) [see various webpages taken from ESCROW website such as: ESCROW_Process_Overview, ESCROW_Step2, ESCROW_Processsing_Payments, etc.,] Dec. 17, 2001.
The International Search Report corresponding to the PCT application No. PCT/US2005/017115.

* cited by examiner

*Primary Examiner* — Daniel Felten
(74) *Attorney, Agent, or Firm* — Morris & Kamlay LLP

(57) ABSTRACT

A method for purchasing a domain name registration. A user conducts a search to determine if a domain name is available. If it is already registered, the user can make an anonymous offer through a third party to the present registrant to purchase the domain name registration. The offer is certified by the third party by verifying that a financial instrument provided by the user has available funds that are at least sufficient to pay the offer amount for the domain name.

38 Claims, 8 Drawing Sheets

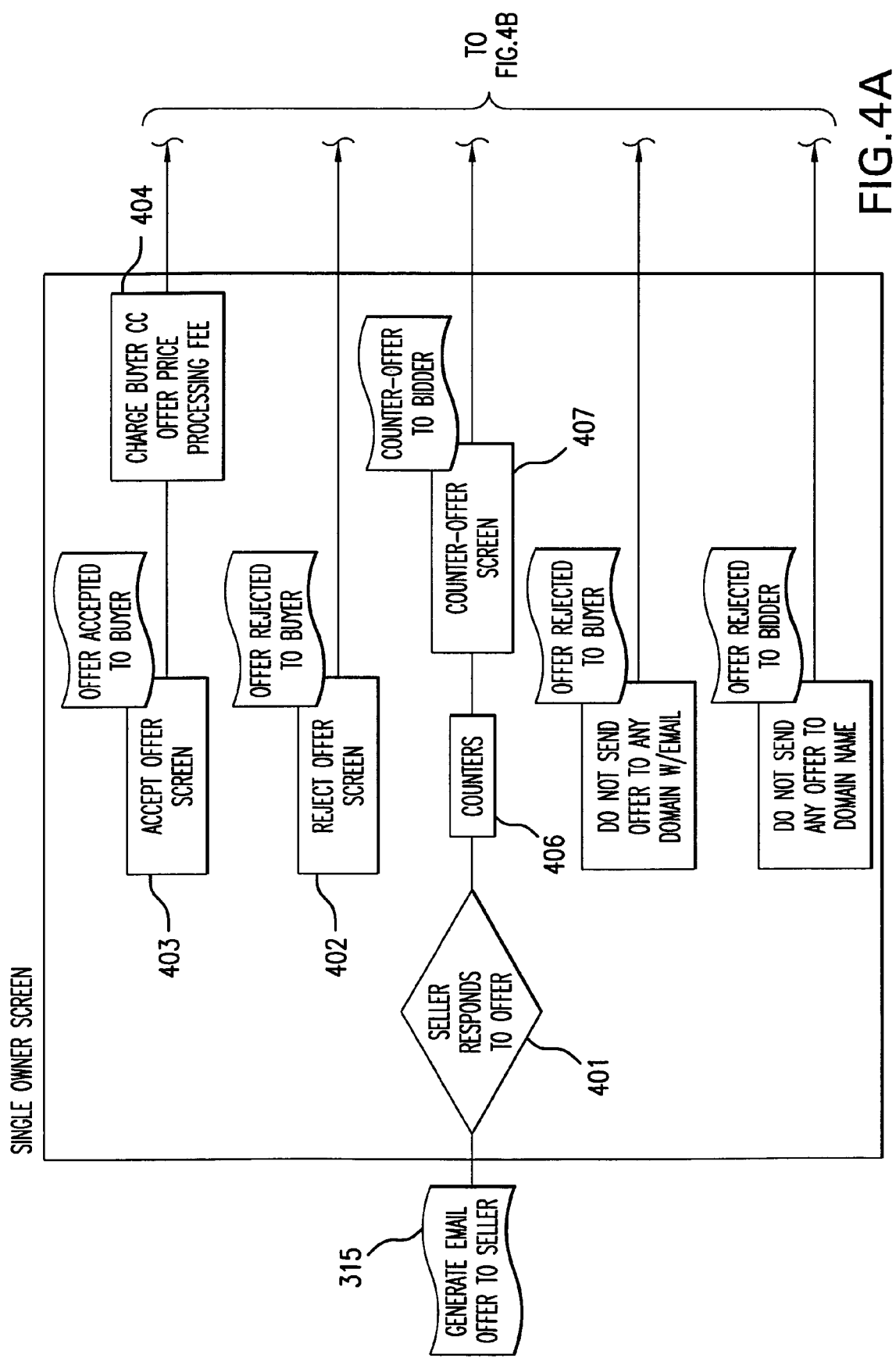

CERTIFIED OFFER SERVICE FOR DOMAIN NAMES

FIELD OF THE INVENTION

The field of the invention is Internet domain names, and in particular the sale of Internet domain name registrations through a service.

DETAILED DESCRIPTION

Figure 1:
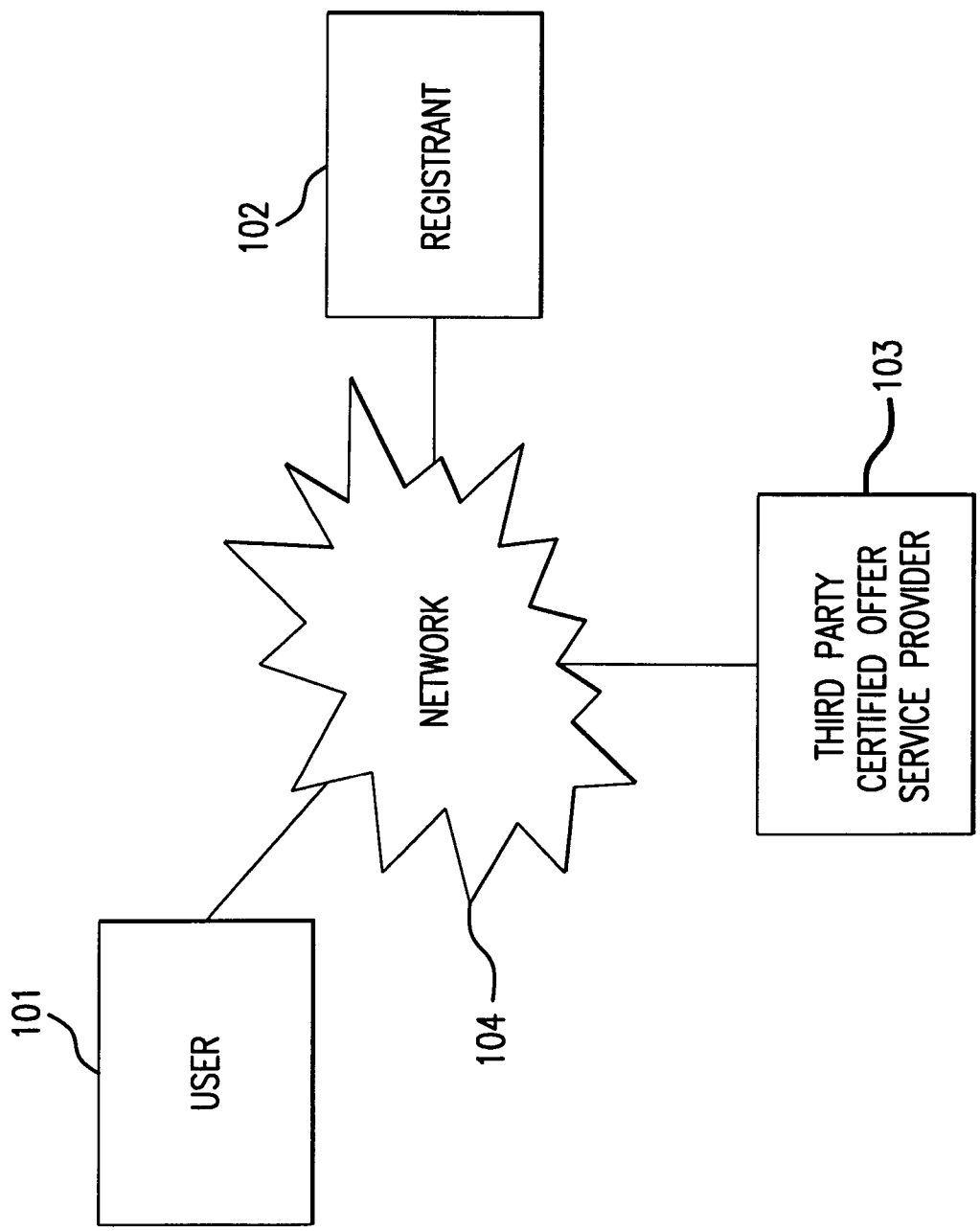
FIG. 1 shows a system in accordance with an embodiment of the present invention.

A system in accordance with an embodiment of the present invention is shown in FIG. 1. A user 101 and a registrant 102 are coupled to a third party service provider 103 through network 104. Third party service provider 103 can be any entity that can effectuate the transfer a domain name, such as a domain name registrar, an entity with a contractual relationship with a domain name registrar, a registry, an independent entity offering the domain name transfer service in accordance with an embodiment of the present invention, etc. Network 104 can be any suitable network, such as the Internet, a Virtual Private Network, a Local Area Network, a wireless network, etc., or any suitable combination thereof.

Figure 2:
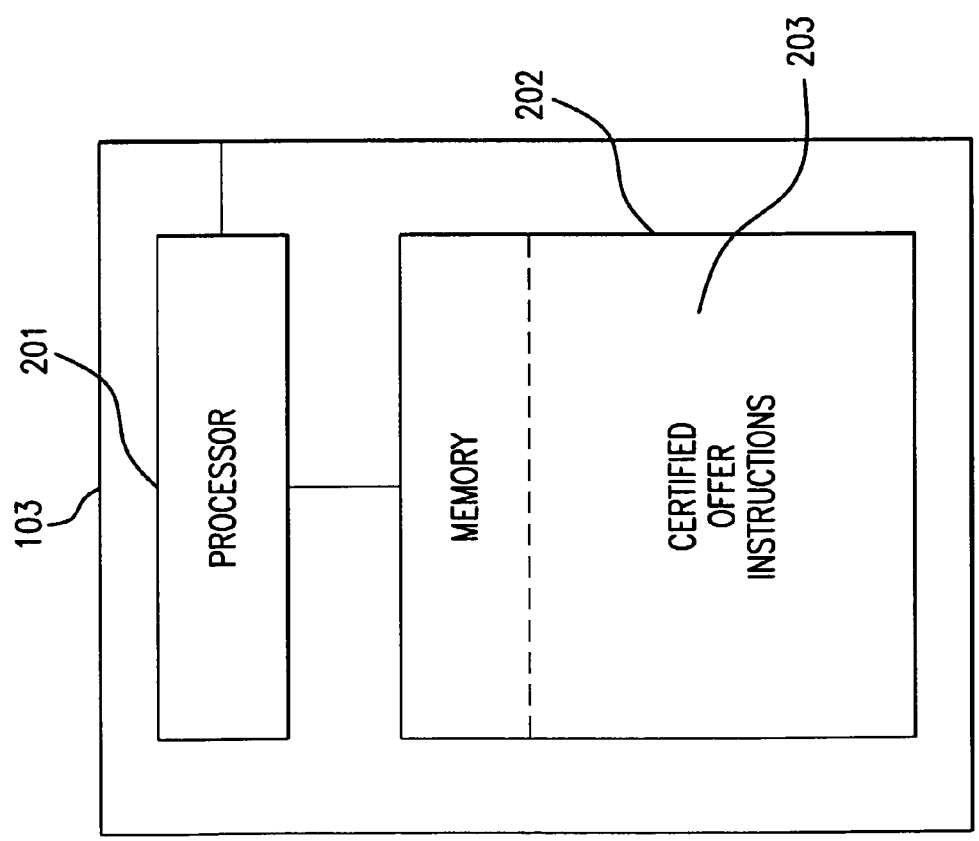
FIG. 2 shows an apparatus in accordance with an embodiment of the present invention.

Third party service provider 103 can include an apparatus such as that shown in FIG. 2. The apparatus of FIG. 2 includes a processor 201 coupled to a memory 202. Processor 201 can be a general purpose microprocessor, such as the Pentium IV processor made by the Intel Corporation of Santa Clara, Calif. Processor 201 can be an Application Specific Integrated Circuit (ASIC) that embodies at least part of the method in accordance with an embodiment of the present invention in its hardware and/or firmware. An example of an ASIC is a Digital Signal Processor.

Memory 202 can be any suitable device that can store electronic information, such as a hard disk, Compact Disc, Random Access Memory (RAM), Read Only Memory (ROM), flash memory, etc., or any suitable combination thereof. Memory 202 stores certified offer instructions 203 that are adapted to be executed by processor 201 to perform the method in accordance with an embodiment of the present invention. All or part of the certified offer instructions can be stored on a medium, which can include fixed or portable memory 202, or a telecommunications channel over which instructions 202 can be transmitted from a sender to a recipient.

Figure 3A:
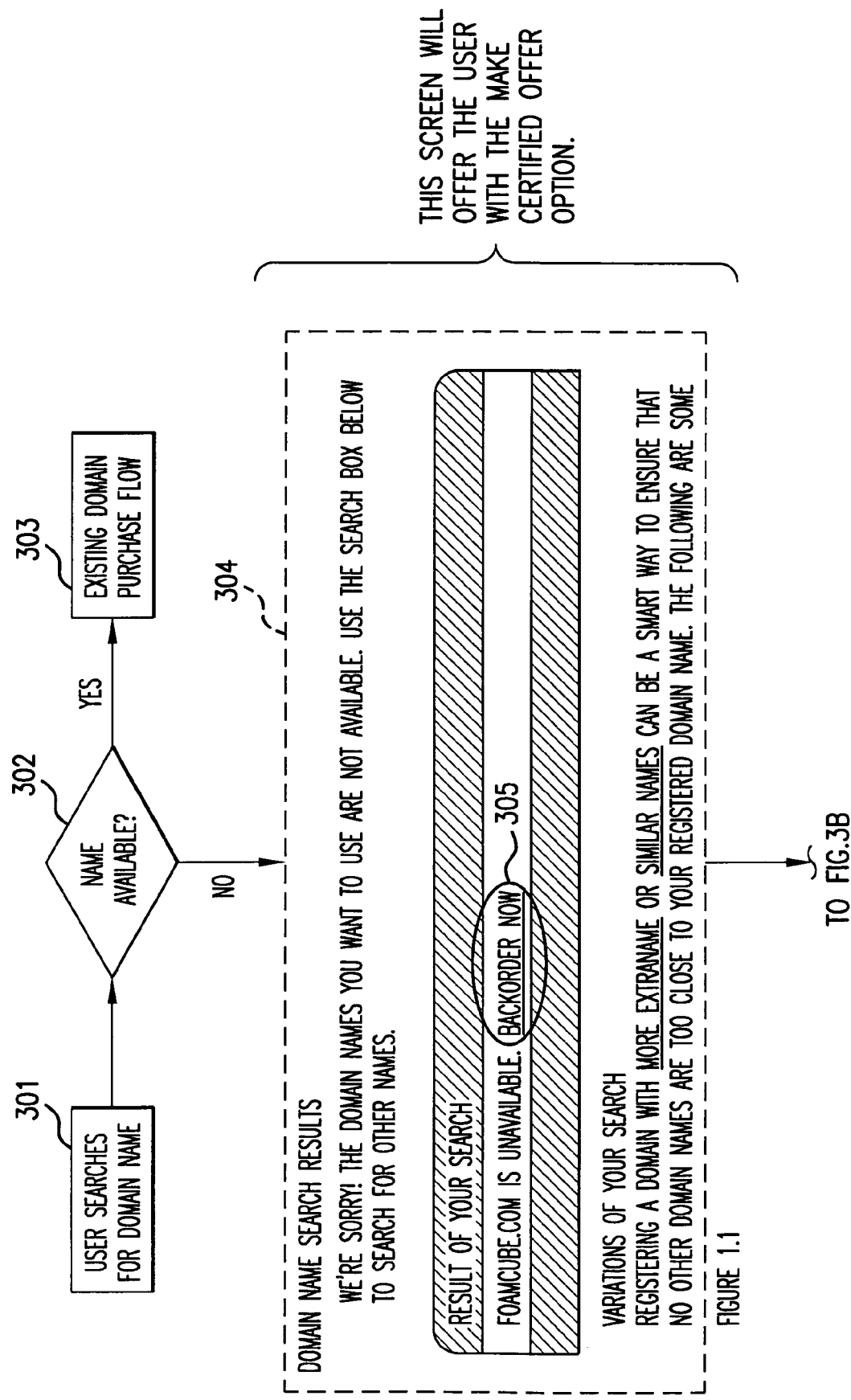
FIG. 3 shows the first part of a method in accordance with the present invention.
Figure 3B:
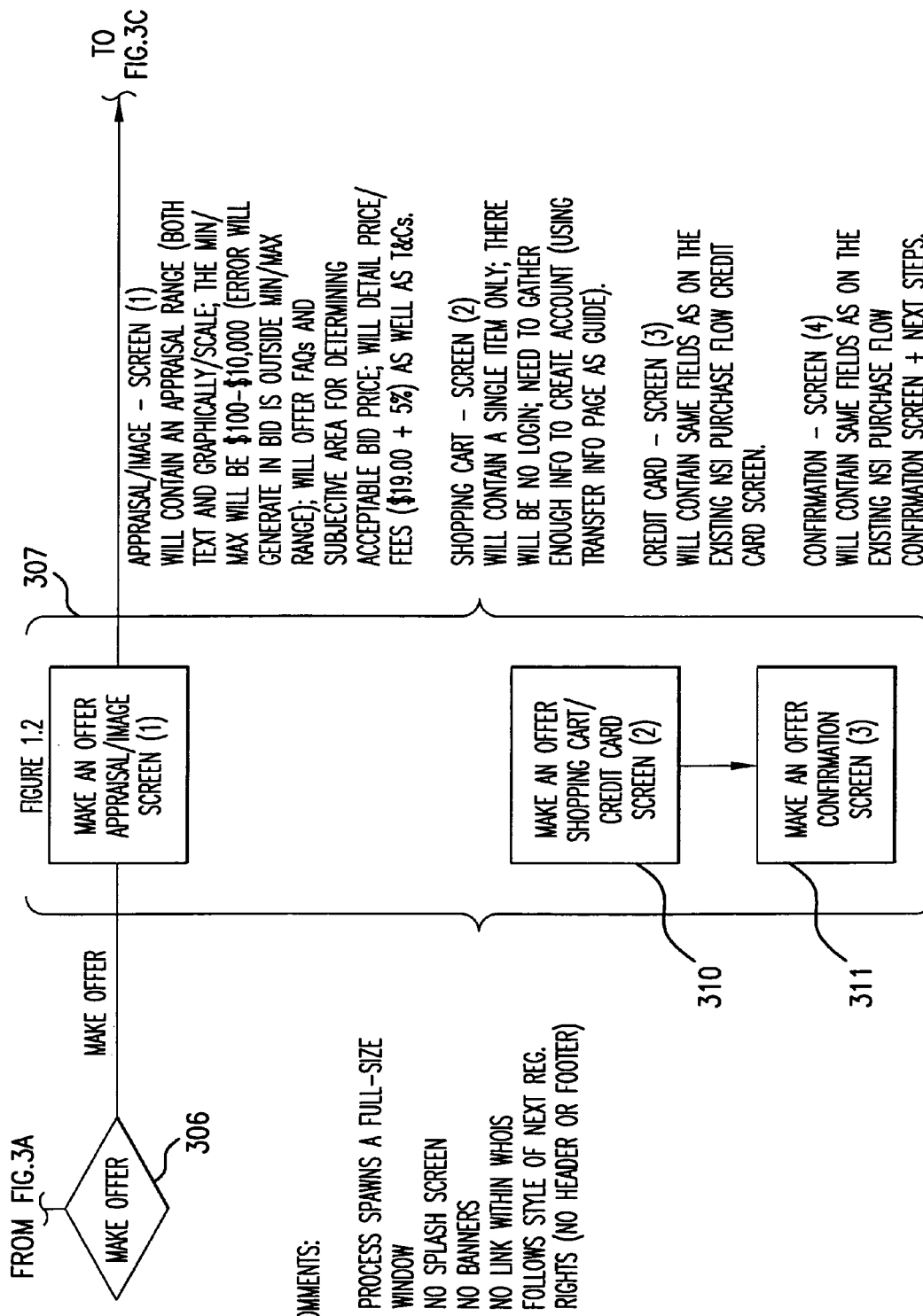
Figure 3C:
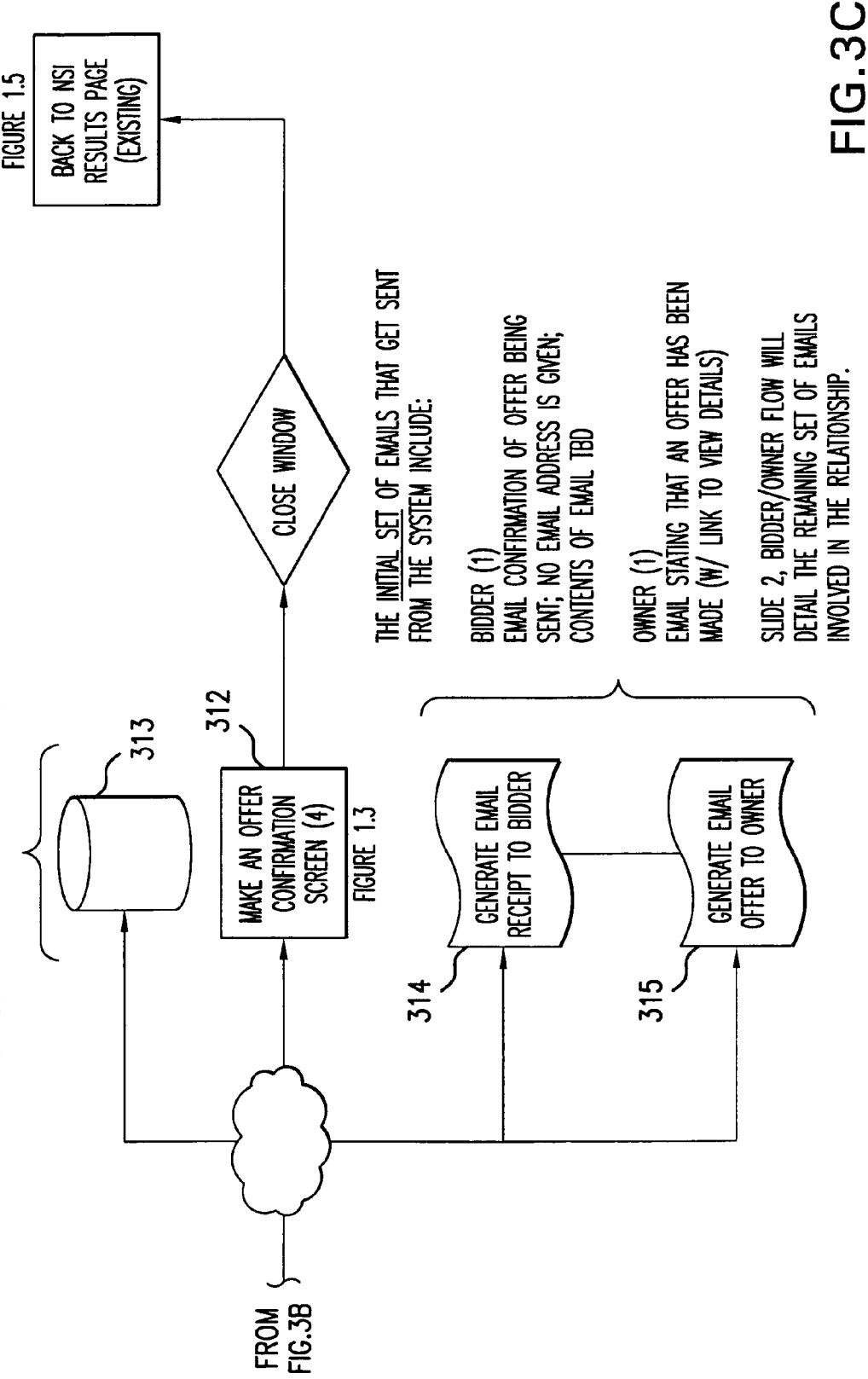

The method in accordance with an embodiment of the present invention is shown in FIG. 3. In this embodiment, the third party service provider is a domain name registrar. A user visits the web site of the registrar to attempt to register a domain name. The user submits the domain name 301 to a search engine at the registrar site to determine if the domain name is available 302, or if it has already been registered by another. If the domain name is available, then the user can register it normally 303.

If the domain name is not available because it is registered to another, the registrar site displays this result 304 to the user along with an option 305 for the user to make a certified offer 306 to purchase the domain name registration from its present registrant. If the user selects this option, the registrar can offer to the user an appraisal service 307 to assist the user in determining an appropriate amount to offer the registrant for the domain name.

The registrar site can appraise the value of the domain name by assessing the amount of traffic to the domain name, e.g., the number of times the name has been resolved by a name server operated by the registrar. Another measurement of "traffic" could be made by conducting a general search of the Internet and determining the number of links to a web page whose address includes the domain name. The more traffic to the name, the higher the appraised value could be.

Similarly, the domain name can be examined for the occurrence of any word or words in English and/or in any other language or languages. Domain names that are generic terms can be valued higher than domain names with fanciful terms that mean nothing in English or other languages. Similarly, domain names in English or Spanish could be valued more highly than domain names in languages spoken in countries with smaller economies.

The length of the domain name can also be considered in assessing its value. Shorter domain names can be assigned a higher value than longer domain names. Likewise, if the domain name links to an active web site, it can raise the appraised value compared to a domain name that does not link to an active site. Certain Top Level Domains ("TLD", e.g., COM, NET, US, etc.) are generally more valuable than others. The value of a domain name with certain TLDs can be appraised to be higher than the same name except having another TLD.

Any suitable metric and/or weighting scheme can be used to obtain an appraisal. In one embodiment, a present range of values can be established, e.g., running from the minimum cost of a registration (e.g., $100) to a large amount, such as $10,000. can be used the relevance of any word or words in the domain name, the length of the domain name, whether the domain name corresponds to a web site, and the top level domain of the domain name. Each of the factors discussed above can be assigned a rating from 1 to 5, based upon an assessment of the factor in light of the domain name requested by the user. For example, the lowest traffic names can be assigned a traffic rating of "1", with the highest receiving a rating of "5" Rules can be implemented for deriving a word/language rating, e.g., if the domain name consists of a single real English or Spanish word, then it could be rated 5; a two or more such words, "4"; a single word in Laotian, "2", etc. The length of the domain name can be assigned a value equal to 7 minus the number of characters in the name, with a minimum score of 1. TLDs can be assigned a rating in accordance with entries in a table (e.g., COM and NET="5", "ORG"="3", etc.)

The ratings can be weighted (or not) according to any suitable scheme. For example, TLD may be judged to be twice as important as language/word content, and so the TLD rating can be counted twice in calculating an overall score for the name. The weighted factor ratings can be summed and then normalized to produce a number between 0 and 1. This number can be multiplied by the difference between the large amount (here, $10,000) and the minimum value (in this example, $100.) The resulting number can be added to the minimum to obtain an appraised dollar value for the domain name requested by the user.

The transaction can proceed by presenting a shopping cart screen 310 to the user. The interface 310 can be used to gather user and user payment information. For example, the user's name, address, e-mail address and financial instrument information (e.g., credit card number, debit card number, deposit account number, etc.) can be submitted by the user through the interface (e.g., such as a shopping cart interface) and received by the registrar. The user can also enter an offer amount for the domain name. The offer amount can be the same as, or different than, the appraisal amount provided by the registrar. The user can submit the offer by selecting a button on the interface, or by any other suitable means.

When the offer is submitted by the user, the user can be presented with confirmation screens 311 and 312, offer information can be stored as a record in an offer database 313. An offer information record can include an offer information identifier for distinguishing the record from other records of other offers, user name and contact information, the domain name that is the subject of the offer, the offer amount, etc.

After the offer is submitted, the registrar can certify the offer by determining if the financial instrument identified by the user has sufficient funds or line of credit to pay at least the offer amount submitted by the user, i.e., the financial instrument can be "preauthorized" for at least the amount of the offer. The financial instrument can be preauthorized for an amount greater that the offer amount, e.g., to verify that the user can pay the offer amount as well as a transaction fee and/or registration fee to the registrar. If the preauthorization is not successful, the offer can be declined by the registrar, and the transaction may be terminated. Alternatively, the user may be asked to provide another financial instrument.

A message 314 (via any suitable medium, e.g., pager message, instant message, SMS message, telephone call, etc.) acknowledging receipt of the offer can be sent to the user. Similarly, an offer message 315 in any suitable medium can be generated and sent to the registrant of the domain name. Contact information for the registrant can be obtained from the whois information for the domain name. The offer message can include a statement averring that the offer is "certified," i.e., that a financial instrument of the offeror (whose identity can be kept secret by the registrar) has been preauthorized for the offer amount and a statement indicating that the offer is good for a certain period of time (e.g., 7 days, 24 hours, until the following Monday at 5 PM, etc.), after which it will expire. An offer message to the registrant can include a link to a registrar interface designed to permit the registrant to respond to the offer, or else the interface can solicit a voice or keystroke response to indicate an action by the registrant in response to the offer.

Figure 4B:
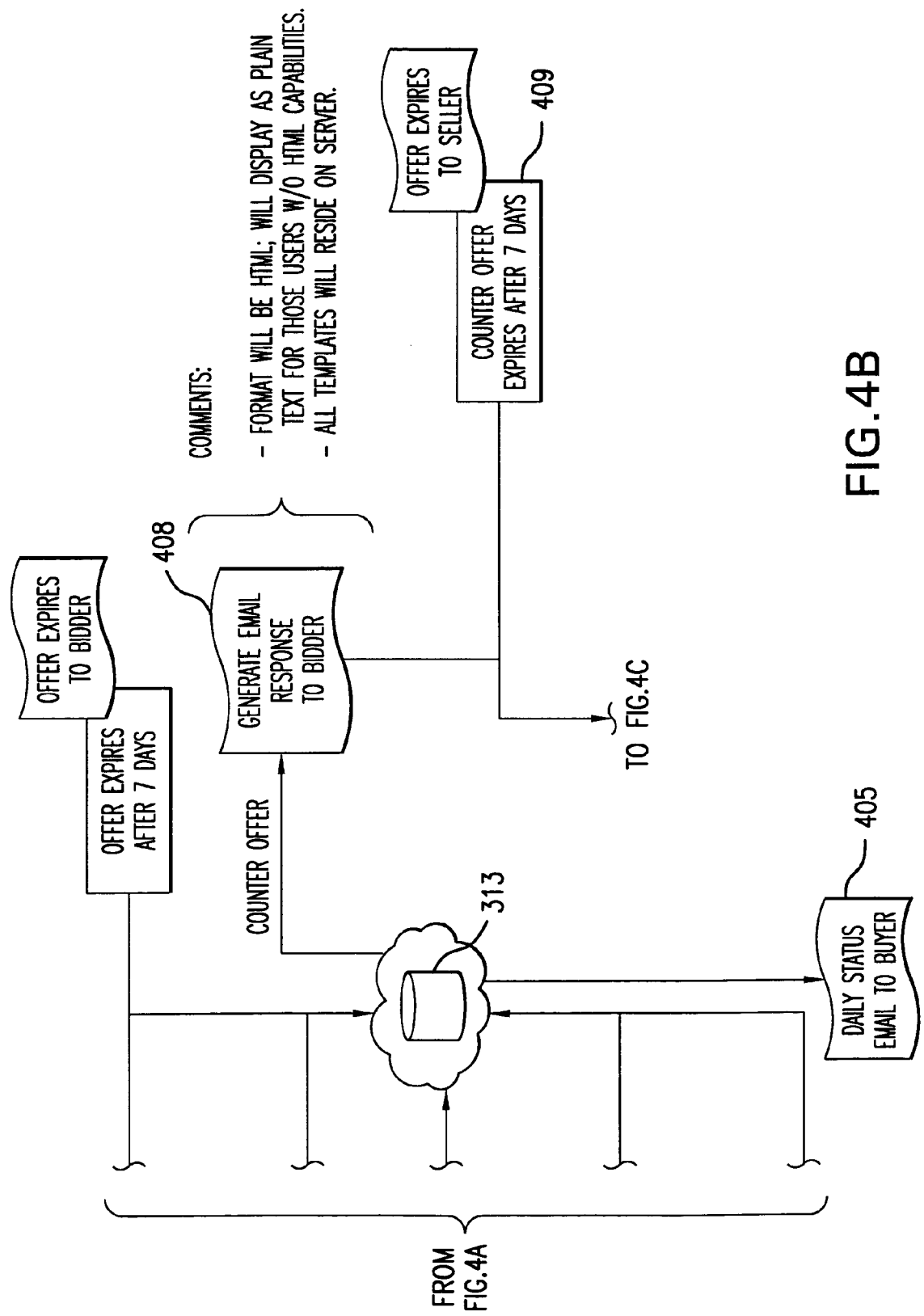
FIG. 4 shows the second part of the method in accordance with an embodiment of the present invention.
Figure 4C:
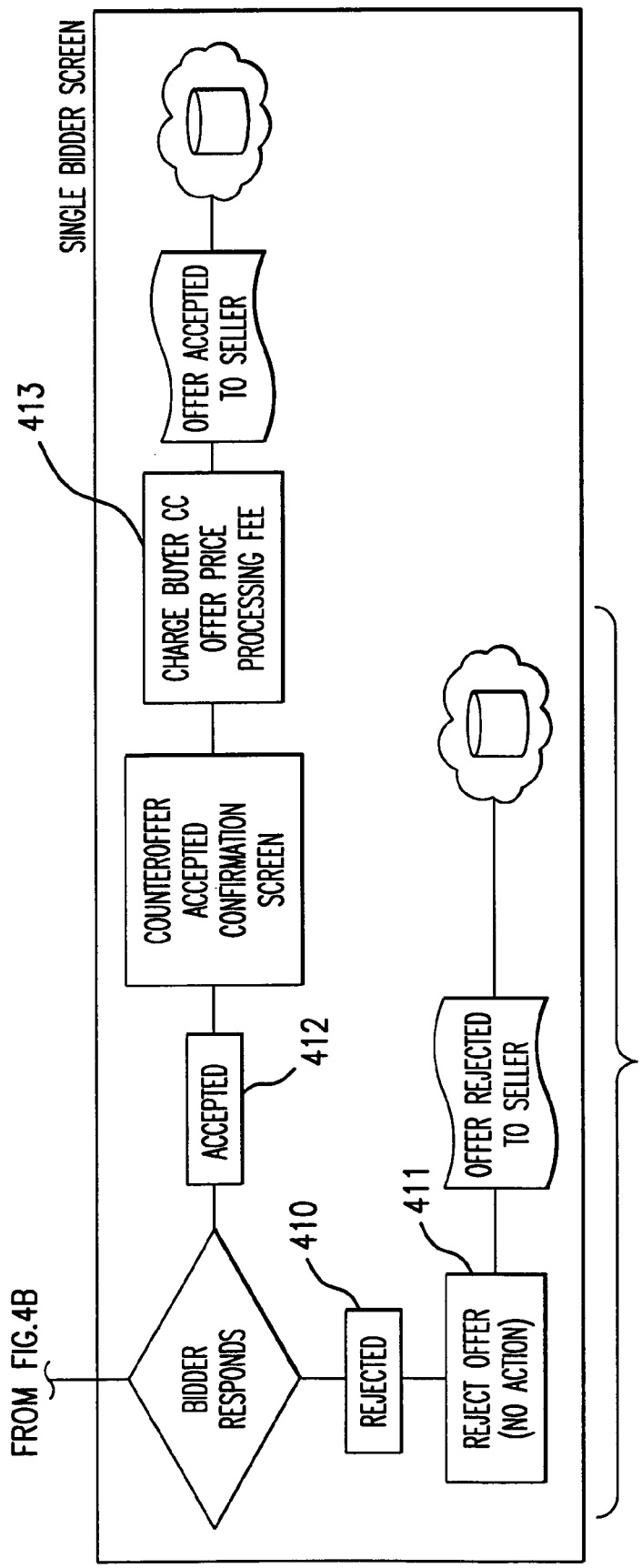

As shown in FIG. 4, the registrant can respond to the offer 401 by rejecting the offer and sending a message to the registrar indicating the rejection. In this case, the user can be informed by the registrar that the offer has been rejected, and can abandon the transaction or make a new, higher offer. Alternatively, the registrant can accept the offer 403. When a message is received by the registrar indicating the registrant has accepted the offer and if the domain name registration is hosted by the registrar, then the registration can be "locked," e.g., changes to the registration can be prevented until the offer transaction is either consummated. The registrar can debit the user's financial instrument 404 and arrange to transfer the domain name from the registrant to the user. For example, the registrar can transfer the domain name to an account set up by the user, and add a year (or other period of time) to the expiration date of the registration. Until the registrant takes action with regard to the offer, the registrar can send periodic offer status updates 405 to the user.

The amount debited the user's financial instrument can be the sum of the offer amount, a transaction fee and a registration fee for the domain name, and can also include other fees.

The registrar can issue and mail to the registrant a check to the sum of the offer amount. Alternatively, the registrar can transfer the offer amount electronically to an account of the registrant. The amount transferred to the registrant can be less than the offer amount, e.g., can be the offer amount less a service charge retained by the registrar. A record of the registrant's response can be added to the offer database.

The registrant can also respond to the offer with a counteroffer 406. The counteroffer can be submitted through a registrant counteroffer interface 407 provided by the registrar. The counteroffer can include a counteroffer amount submitted by the registrant. The counteroffer amount is the amount that the registrant will accept to transfer the domain name registration to the user. The counteroffer can be sent in a message 408 (via any suitable medium, e.g., e-mail, SMS message, instant message, telephone call, etc.) to the user. The counteroffer can be good indefinitely, or for a certain period of time before expiring 409. The registration can be locked when the registrar receives the message indicating that the registrant has submitted a counteroffer. The user can reject the counteroffer 410, in which case the transaction can be terminated 411. The user can accept the counteroffer 412. If the counteroffer is accepted by the user, then the user financial instrument can be debited 413 an amount equal to at least the amount of the counteroffer. The user financial instrument can also be debited for registration and service fees. The registrar can issue and mail a check to the registrant to the sum of the counteroffer amount, or to the sum of the counteroffer amount less a service fee. Alternatively, the registrar can electronically transfer the funds to a registrant account.

A record of the responses of the user and registrant, as well as financial details concerning the transaction, can be added to the offer database.

After a successful offer (or counteroffer) transaction, the registrar can contact the user to obtain the necessary information for transferring the domain name registration from the registrant to the user, e.g., information not gathered thus far in the transaction, such as a choice of name servers, a fax number for the user, etc. Alternatively, some or all of this information can be gathered at the beginning from the user, or at any convenient point during the transaction.

The foregoing description is meant to illustrate, and not limit, the scope of the invention. One of skill in the art will understand that the invention encompasses other aspects that have not been explicitly described. For example, the third party providing the domain name offer and/or counteroffer service need not be a registrar, but may be any entity that can effectuate the transfer of a domain name.

What is claimed is:

1. A computer-implemented method for purchasing a domain name registration, comprising:

receiving at a computer system a request identifying a domain name registered to a registrant;

providing, by the computer, an appraisal estimating the value of the domain name, the appraisal based on an evaluation of at least the length of the domain name and the top level domain included in the domain name;

receiving from a user an offer message indicating an offer amount, certifying that the user has access to funds that are at least sufficient to pay the offer amount; and responsive to the offer amount being successfully certified, sending to the registrant an offer to purchase the domain name registration from the registrant.

2. The method of claim 1, wherein certifying that the user has access to funds that are at least sufficient to pay the offer amount includes pre authorizing a credit card of the user for at least the amount of the offer.

3. The method of claim 1, wherein certifying that the user has access to funds that are at least sufficient to pay the offer amount includes checking the balance of an account of the user at a bank based upon a debit instrument of the user, wherein the debit instrument is issued by the bank.

4. The method of claim 1, wherein certifying that the user has access to funds that are at least sufficient to pay the offer amount includes checking the balance of a deposit account maintained by the user.

5. The method of claim 1, wherein the offer to purchase the domain name registration is sent to the registrant without revealing the identity of the user.

6. The method of claim 1, further comprising:
receiving an acceptance of the offer from the registrant;
debiting a financial instrument of the user; and
arranging for the transfer of the domain name from the registrant to the user.

7. The method of claim 1, further comprising:
receiving from a user a search request for a domain name;
providing to the user search results that show the domain name is registered to a registrant distinct from the user; and
wherein the domain name indicated in the offer message is the domain name in the search results shown to be registered to the registrant distinct from the user.

8. The method of claim 1, further comprising locking the registration of the domain name after receiving a message from the registrant indicating that the registrant has accepted the offer or after receiving a message from the user indicating that the user has accepted the counteroffer.

9. The method of claim 1, wherein the registrant is given a period of time within which to respond to the offer to purchase the domain name registration, after which the offer expires.

10. The method of claim 1, further comprising:
receiving from the registrant a counteroffer to sell the domain name registration, wherein the counteroffer includes a counteroffer amount; and
sending to the user an indication of the counteroffer, including the counteroffer amount.

11. The method of claim 10, further comprising:
receiving from the user an acceptance of the counteroffer; and
sending the acceptance of the counteroffer to the registrant.

12. The method of claim 11, further comprising:
debiting a financial instrument of the user; and
arranging for the transfer of the domain name from the registrant to the user.

13. The method of claim 1, further including: providing to the user an appraisal estimating the value of the domain name, wherein the appraisal is further based upon at least one from the group of:
the amount of traffic using the domain name,
the relevance of any word or words in the domain name, and
whether the domain name corresponds to a web site.

14. The method of claim 6, further comprising paying the registrant by check.

15. The method of claim 12, further comprising paying the registrant by check.

16. The method of claim 6, further including receiving registration information from the user, wherein the registration information is used to register the domain name to the user.

17. The method of claim 12, further including receiving registration information from the user, wherein the registration information is used to register the domain name to the user.

18. A non-transitory computer-readable medium storing instructions that cause a processor to perform steps including:
receiving a request identifying a domain name registered to a registrant;
providing an appraisal estimating the value of the domain name, the appraisal based on an evaluation of at least the length of the domain name and the top level domain included in the domain name;
receiving from a user an offer message indicating an offer amount;
certifying that the user has access to funds that are at least sufficient to pay the offer amount; and
responsive to the offer amount being successfully certified, subsequent to the certifying, sending to the registrant an offer to purchase the domain name registration from the registrant.

19. The medium of claim 18, wherein said instructions further cause said processor to perform the step of certifying that the user has access to funds that are at least sufficient to pay the offer amount includes pre authorizing a credit card of the user for at least the amount of the offer.

20. The medium of claim 18, wherein said instructions further cause said processor to perform the step of certifying that the user has access to funds that are at least sufficient to pay the offer amount includes checking the balance of an account of the user at a bank based upon a debit instrument of the user, wherein the debit instrument is issued by the bank.

21. The medium of claim 18, wherein said instructions further cause said processor to perform the step of certifying that the user has access to funds that are at least sufficient to pay the offer amount includes checking the balance of a deposit account maintained by the user.

22. The medium of claim 18, wherein said instructions further cause said processor to perform the step of sending the offer to purchase the domain name registration to the registrant without revealing the identity of the user.

23. The medium of claim 18, wherein said instructions further cause said processor to perform the steps of:
receiving an acceptance of the offer from the registrant;
debiting a financial instrument of the user; and
arranging for the transfer of the domain name from the registrant to the user.

24. The medium of claim 18, wherein said instructions further cause said processor to perform the steps of:
receiving from a user a search request for a domain name;
providing to the user search results that show the domain name is registered to a registrant distinct from the user; and
wherein the domain name indicated in the offer message is the domain name in the search results shown to be registered to the registrant distinct from the user.

25. The medium of claim 18, wherein said instructions further cause said processor to perform the step of locking the registration of the domain name after receiving a message from the registrant indicating that the registrant has accepted the offer or after receiving a message from the user indicating that the user has accepted the counteroffer.

26. The medium of claim 18, wherein said instructions further cause said processor to perform the step of giving the registrant a period of time within which to respond to the offer to purchase the domain name registration, after which the offer expires.

27. The medium of claim 18, wherein said instructions further cause said processor to perform the steps of:
   receiving from the registrant a counteroffer to sell the domain name registration, wherein the counteroffer includes a counteroffer amount; and
   sending to the user an indication of the counteroffer, including the counteroffer amount.

28. The medium of claim 27, wherein said instructions further cause said processor to perform the steps of: receiving from the user an acceptance of the counteroffer; and sending the acceptance of the counteroffer to the registrant.

29. The medium of claim 28, wherein said instructions further cause said processor to perform the steps of:
   debiting a financial instrument of the user; and
   arranging for the transfer of the domain name from the registrant to the user.

30. The medium of claim 18, wherein the appraisal is further based upon at least one from the group of:
   the amount of traffic using the domain name,
   the relevance of any word or words in the domain name, and
   whether the domain name corresponds to a web site.

31. The medium of claim 23, wherein said instructions further cause said processor to perform the step of paying the registrant by check.

32. The medium of claim 29, wherein said instructions further cause said processor to perform the step of paying the registrant by check.

33. The medium of claim 23, wherein said instructions further cause said processor to perform the step of receiving registration information from the user, wherein the registration information is used to register the domain name to the user.

34. The medium of claim 29, wherein said instructions further cause said processor to perform the step of receiving registration information from the user, wherein the registration information is used to register the domain name to the user.

35. The method of claim 1, wherein the offer sent to the registrant indicates that the offer is certified for the offer amount.

36. The medium of claim 18, wherein the offer sent to the registrant indicates that the offer is certified for the offer amount.

37. The method of claim 1, wherein the appraisal is further based upon at least the amount of traffic using the domain name, the relevance of at least one word in the domain name, and whether the domain name corresponds to a web site.

38. The medium of claim 18, wherein the appraisal is further based upon at least the amount of traffic using the domain name, the relevance of at least one word in the domain name, and whether the domain name corresponds to a web site.

* * * * *